United States Patent
Xu (10) Patent No.: US 7,295,642 B2
(45) Date of Patent: Nov. 13, 2007

(54) JITTER COMPENSATION AND GENERATION IN TESTING COMMUNICATION DEVICES

(75) Inventor: Fang Xu, Newton, MA (US)

(73) Assignee: Teradyne, Inc., North Reading, MA (US)

( * ) Notice: Subject to any disclaimer, the term of this patent is extended or adjusted under 35 U.S.C. 154(b) by 148 days.

(21) Appl. No.: 11/172,306

(22) Filed: Jun. 30, 2005

(65) Prior Publication Data

US 2007/0002964 A1    Jan. 4, 2007

(51) Int. Cl.
*H03D 3/24* (2006.01)
(52) U.S. Cl. .............. 375/373; 375/226; 375/371
(58) Field of Classification Search .......... 375/371, 375/373, 296, 226; 702/69; 703/19
See application file for complete search history.

(56) References Cited

U.S. PATENT DOCUMENTS

| | | | | |
|---|---|---|---|---|
| 7,054,358 | B2* | 5/2006 | Yamaguchi et al. | 375/226 |
| 2004/0125887 | A1* | 7/2004 | Dryden et al. | 375/296 |
| 2005/0031029 | A1* | 2/2005 | Yamaguchi et al. | 375/226 |
| 2005/0125175 | A1* | 6/2005 | Murugan et al. | 702/69 |
| 2006/0047494 | A1* | 3/2006 | Tamura et al. | 703/19 |

OTHER PUBLICATIONS

International Search Report for Application No. PCT/US06/17873.
Written Opinion for Application No. PCT/US06/17873.

* cited by examiner

*Primary Examiner*—Phuong Phu
(74) *Attorney, Agent, or Firm*—Fish & Richardson P.C.

(57) ABSTRACT

Methods, system, and computer programs for compensating for jitter in a communication system are described. A transfer function of a transmission medium is measured and an output signal that results from propagating an input signal through the transmission medium is calculated. Data dependent jitter is determined in the output signal. In memory, compensated edge positions of the input signal are stored. The compensated edge positions are arranged such that the data dependent jitter causes edge positions of the output signal to move closer to ideal edge positions.

20 Claims, 9 Drawing Sheets

| Bit Sequence | DDJ Compensation |
|---|---|
| $b_0\ b_1\ b_2\ b_3$ | $<0,0,0,0>$ |
| 0 0 0 0 | $<0,0,0,t\text{-}\Delta t>$ |
| 0 0 0 1 | . |
| . | . |
| . | . |
| . | . |
| 1 0 0 1 | $<t_0'\text{-}\Delta t_0, t_1'\text{-}\Delta t_1, 0, t_3'\text{-}\Delta t_3>$ |
| . | . |
| . | . |
| . | . |
| 1 1 1 1 | $<0,0,0,0>$ |

| Bit Sequence | |
|---|---|
| $b_0\ b_1\ b_2\ b_3$ | $<0,0,0,0>$ |
| 0 0 0 0 | $<0,0,0,-\Delta t>$ |
| 0 0 0 1 | . |
| . | . |
| . | . |
| . | . |
| 1 0 0 1 | $<t_0+\Delta t_0\pm\epsilon, t_1+\Delta t_1\pm\epsilon, --, t_3+\Delta t_3\pm\epsilon>$ |
| . | . |
| . | . |
| . | . |
| 1 1 1 1 | $<0,0,0,0>$ |

FIG. 6

JITTER COMPENSATION AND GENERATION IN TESTING COMMUNICATION DEVICES

TECHNICAL FIELD

This invention relates to reducing deterministic jitter and generating jitter in testing communication devices using a testing instrument.

BACKGROUND

Jitter is the difference between an expected occurrence of a signal edge and the time the edge actually occurs. Jitter may also be expressed as the movement of a signal edge from its ideal position in time. Jitter is introduced when the signal is propagating from a transmitting device to a receiving device. At the receiving device, information is extracted from the signal by sampling the signal at specific instants of time, referred to as sampling instances. Ideally these sampling instants would always occur at the center of a data bit time, equidistant between two adjacent edge transition points. The presence of jitter changes the edge positions with respect to the sampling instance which can induce errors and loss of synchronization. In a communications system, the accumulation of jitter will eventually lead to data errors.

Jitter appears as two distinct types: random jitter and deterministic jitter. Random jitter is caused primarily by device thermal noise. Deterministic jitter can be caused by power supply fluctuations, power line noise, cross-talk, and duty cycle distortion (asymmetric rising and falling edges).

Data dependant jitter (DDJ) is a component of DJ that causes timing errors which vary with the data pattern used. Timing errors caused by DDJ in turn produce duty-cycle distortion or intersymbol interference (ISI). DDJ often results from component and system bandwidth limitations and signal attenuation. The higher frequency components of the transmitted signal have less time to settle than the lower frequency components and are attenuated more quickly. This leads to changes in the start conditions of the signal edges and produces timing errors that are dependent on the data pattern being applied. Current methods, such as those performed in an equalizer, for reducing DDJ involve amplifying the high frequency components of the signal before transmission.

SUMMARY

The invention provides methods and system, including computer program products, for compensating for jitter in a communication system.

In general, in one aspect, the invention features a method that includes measuring a transfer function of a transmission medium; calculating an output signal that results from propagating an input signal through the transmission medium by convolving the transfer function with the input signal; determining data dependent jitter in the output signal; and in memory, storing compensated edge positions of the input signal. The compensated edge positions are arranged such that the data dependent jitter causes edge positions of the output signal to move closer to ideal edge positions. This aspect may include one or more of the following embodiments.

Measuring the transfer function may include calculating an output signal of the transmission medium that results from propagating an approximated step function through the transmission medium; calculating a step response of the transmission medium from the approximated step function and the calculated output signal; and differentiating the step response to obtain the transfer function. A signal having the compensated edge positions may be convolved with the transfer function to calculate compensated edge positions that correct the data dependent jitter to second order.

A first distribution of transition windows (i.e., time intervals over which edge transitions are expected occur) may be calculated when data dependent jitter is present in the output signal. A second distribution of transition windows for a second output signal that results from propagating a second input signal through the transmission medium may be calculated. At the receiving device, the distributions of transition windows may be stored in memory.

Calculating the output signal may include injecting data dependent jitter calculated for a second transmission medium such that the receiving device receives data dependent jitter contributed from the first transmission medium and the second transmission medium. A signal may be captured at the receiving device. The transition times of the signal may be compared to the distributions of transition windows stored in memory, and a bit sequence that corresponds to the distribution that most closely matches the transitions times of the signal may be looked up.

In general, in another aspect, the invention features a system for compensating for jitter in a communication system. The system includes a measuring instrument configured to measure a transfer function of a transmission medium, calculate an output signal that results from propagating an input signal through the transmission medium by convolving the transfer function with the input signal, and determine data dependent jitter in the output signal. The system also includes memory for storing compensated edge positions of the input signal, the compensated edge positions being arranged such that the data dependent jitter causes edge positions of the output signal to move closer to ideal edge positions; and a testing instrument for propagating an approximated step function through the transmission medium. The measuring instrument is further configured to calculate an output signal of the transmission medium that results from propagating an approximated step function through the transmission medium; calculate the step response of the transmission medium from the approximated step function and the calculated output signal; and differentiate the step response to obtain the transfer function. This aspect may include one or more of the following embodiments.

The testing instrument may include memory for storing the table of compensated edge positions of the initial output signal. The memory may store compensated edge positions that correct the data dependent jitter to second order. The measuring instrument may be further configured to calculate a first distribution of transition windows for the output signal, the edge transition windows being time intervals over which edge transitions are expected occur when data dependent jitter is present in output signal; and calculate a second distribution of transition windows for a second output signal that results from propagating a second input signal through the transmission medium.

A receiving device including memory for storing the distributions of transition windows calculated by the measuring instrument may be provided. The receiving device may be configured to capture a signal; compare transition times of the signal to the distributions of transition window stored in the memory; and look up a bit sequence that corresponds to the distribution that most closely matches the transitions times of the signal. The memory may store only one distribution of transition windows from a set of redundant distributions of transition windows.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1b is a block diagram of the testing instrument shown in the testing system of FIG. 1a.

FIG. 1c shows an output signal waveforms before and after it is transmitted through the testing system shown in FIG. 1a.

FIG. 2 shows a flowchart of a process for compensating for data dependent jitter using the testing system of FIG. 1a.

FIG. 4b shows an output signal waveforms before and after it is transmitted through the testing system shown in FIG. 4a.

FIG. 5 shows a flowchart of a process for compensating for data dependent jitter using the testing system of FIG. 1a.

DETAILED DESCRIPTION

Figure 1A:
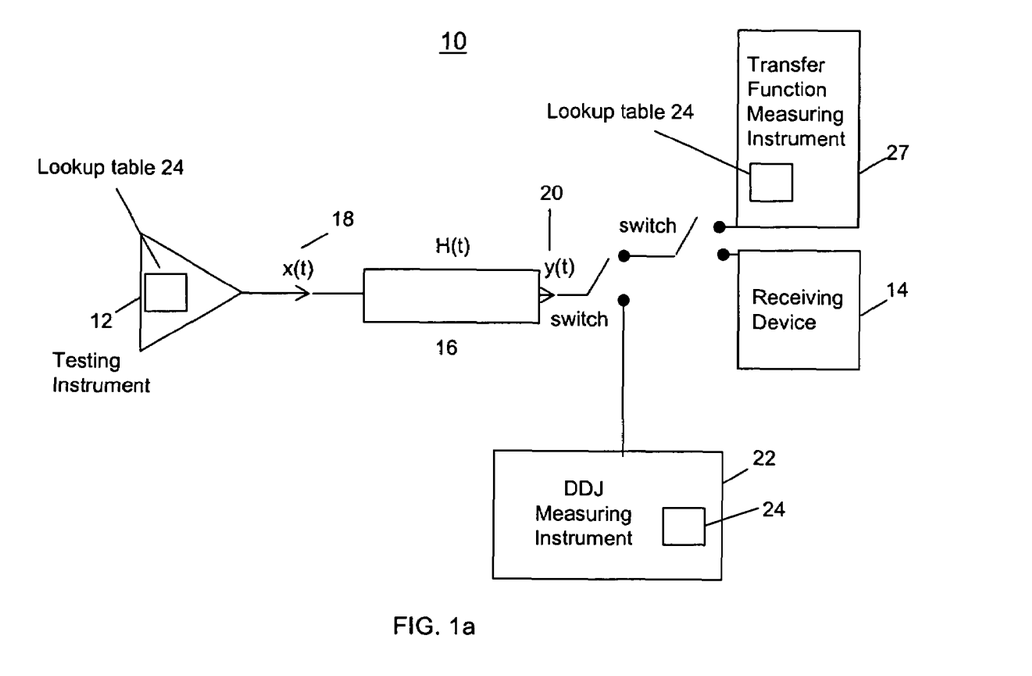
FIG. 1a is a block diagram of a testing system for characterizing data dependent jitter in a communication system.
Figure 1B:
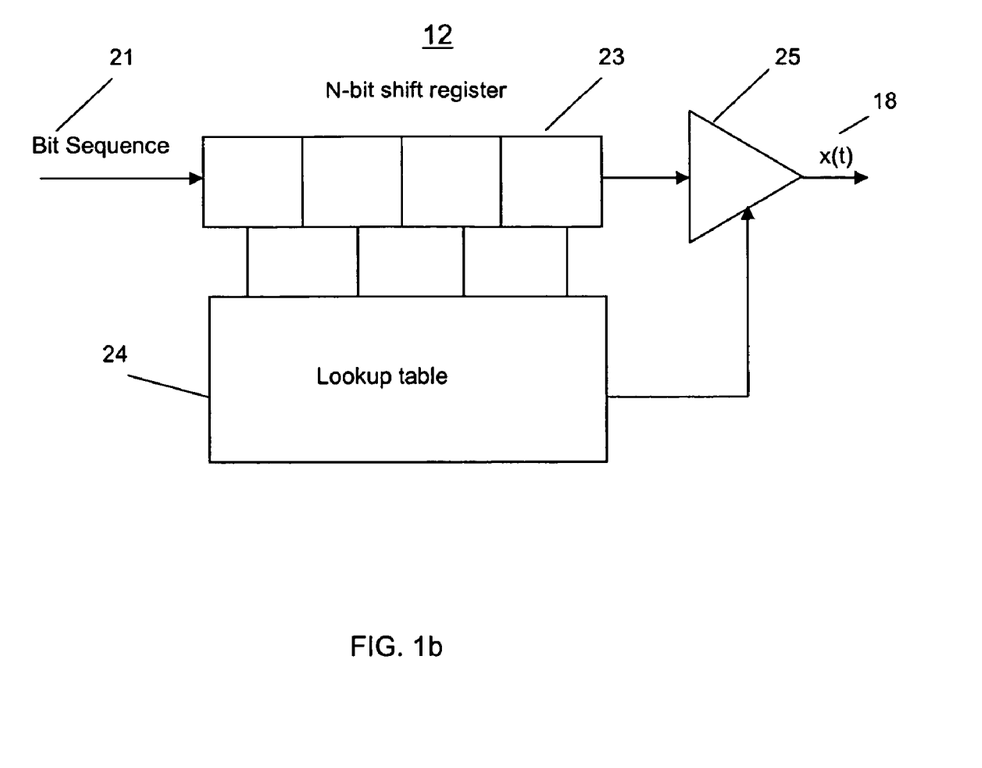
Figure 1C:
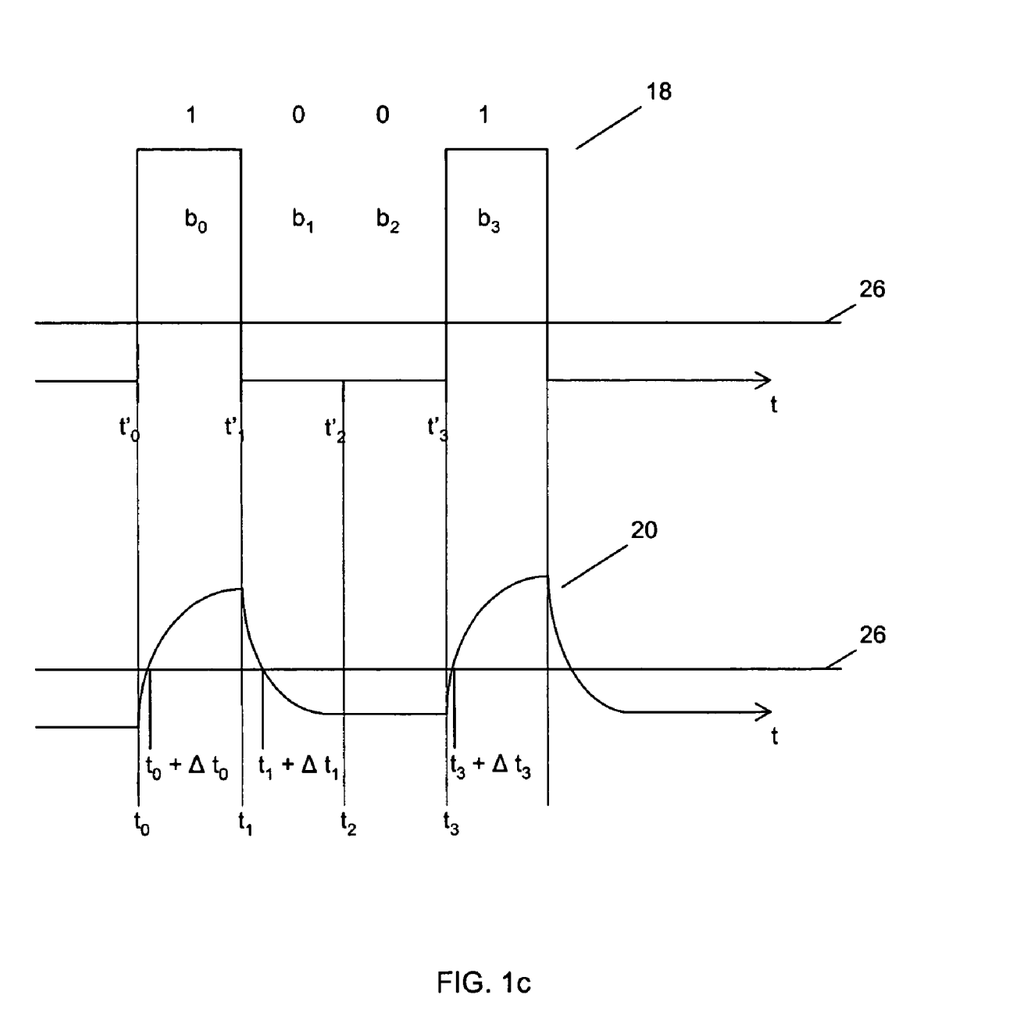

FIGS. 1a-c show a testing system 10 for characterizing and compensating for data dependent jitter (DDJ) in a transmitted signal. Testing system 10 includes a testing instrument 12, a receiving device 14, a DDJ measuring instrument 22, a transfer function measuring instrument 27, and a transmission medium 16 that interfaces the testing instrument 12 and either receiving device 14, DDJ measuring instrument 22, or transfer function measuring instrument 27. Examples of transmission medium 16 include conductors (e.g., cables and wires), fiber optics, and wireless channels. In some embodiments, the data transmission speed of transmission medium 16 ranges between 100 MHz and 10 GHz. Testing instrument 12 includes a programmable signal generator that produces a digital test signal which has edge placement control capability. The test signal at this stage, before it is propagated through transmission medium 16, is referred to as initial output signal 18, i.e., denoted x(t). Initial output signal 18 may be a string of bits or multilevel values. The test signal propagates through transmission medium 16 to receiving device 14. After the test signal is propagated through transmission medium 16, the test signal is referred to as propagated output signal 20, e.g., denoted y(t). DDJ measuring instrument 22 measures propagated output signal 20 and determines its amplitude as a function of time. DDJ measuring instrument 22 and transfer function measuring instrument 27 may be any data acquisition instruments, such oscilloscopes or logic analyzers.

FIG. 1b shows a block diagram of testing instrument 12. Testing instrument 12 includes a shift register 23, square wave generator 25, and lookup table 24. A bit sequence 21 is entered at the input of shift register 23. Shift register 23 holds N bits at a time. Lookup table 24 stores the edge positions for multiple bit sequences. When a bit sequence is entered into shift register 23, lookup table 24 retrieves the edge positions stored for the bit sequence. Lookup table 24 then sends the edge positions to square wave generator 25 which encodes the bit sequence as a square wave having the specified edge positions sent from lookup table 24.

FIG. 1c shows DDJ of exemplary signal that is produced at the output of testing instrument 12 and propagated through transmission medium 16. The initial output 18 of testing instrument 12 is a square wave that encodes the binary string, "1001". A binary "zero" is represented when the signal amplitude is less than a decision threshold value 26 over a given time interval (e.g., between $t_1'$ and $t_2'$). Similarly, a binary "one" is represented when the amplitude of the square wave is greater than threshold value 26. In some embodiments, a binary "zero" is represented when the amplitude of the square wave is greater than threshold 26 and a binary "one" is represented when the amplitude of the square wave is less than threshold value 26. The points at which initial output signal 18 and propagated signal 20 transition above or below the threshold are referred to as edge positions.

Ideally, if there were no DDJ introduced into the test signal, the edge positions of propagated output signal 20 would occur at $t_0$, $t_1$, and $t_3$. In reality, however, the edge positions of the signals are different. As the output signal propagates through transmission medium 16, it is attenuated. The attenuation is proportional to the square root of the frequency which contributes to the rounded edges and slow settling time seen in the resulting propagated output signal 20. The distortion causes the propagated output signal 20 to transition above or below the threshold at different times than expected. The difference (e.g., $\Delta t_0$) in time between the expected occurrence of a signal edge (e.g., $t_0$) and the time the edge actually occurs (e.g., $t_0+\Delta t_0$) is referred to as an edge timing error. The edge timing errors (e.g., $\Delta t_0$, $\Delta t_1$, and $\Delta t_3$) for each of binary values are collectively DDJ. The DDJ of propagated output signal 20 depends on the combination of values in initial output signal 18. Certain combinations of values may be more susceptible to DDJ than other combinations. For example, a binary string of all binary "ones" or "zeros" is much less prone to DDJ than a binary string with alternating binary "ones" and "zeros." The timing errors of a propagated value depend on the values that were previously transmitted. The amount by which the edge positions of a value of the test signal changes depends on the edge positions of previous values of the test signal. In some embodiments transmission medium 16 includes signal repetitors that attempt to reconstruct the initial output signal 18 after it travels a distance through transmission medium 16. The DDJ in propagated output signal 20 is often exacerbated because the cables between the repetitors cause the propagating signal to accumulate DDJ.

Testing instrument 12 produces an initial output signal 18 having programmed rising and falling edge positions. Any combination of edge positions of the initial output signal 18 can be changed by simply supplying new edge-position specifications to testing instrument 12. If the DDJ of a particular bit sequence is known, the original edge positions of the of the initial output signal 18 can be adjusted (either advanced or delayed from their original positioned in advance) to compensate for the DDJ induced by the transmission medium 16 and the testing instrument 12. In other words, the original edge positions of the initial output signal 18 are moved to compensated edge positions such that when the signal passes through the transmission medium, the DDJ injected into the signal causes the edge positions of the propagated output signal 20 to move closer to their ideal positions, i.e., $t_0$, $t_1$, and $t_3$. These are the ideal edge positions that would result if there was no DDJ introduced into the propagated output signal 20. The compensated edge positions are stored in lookup table 24 in testing instrument 12.

Figure 2:
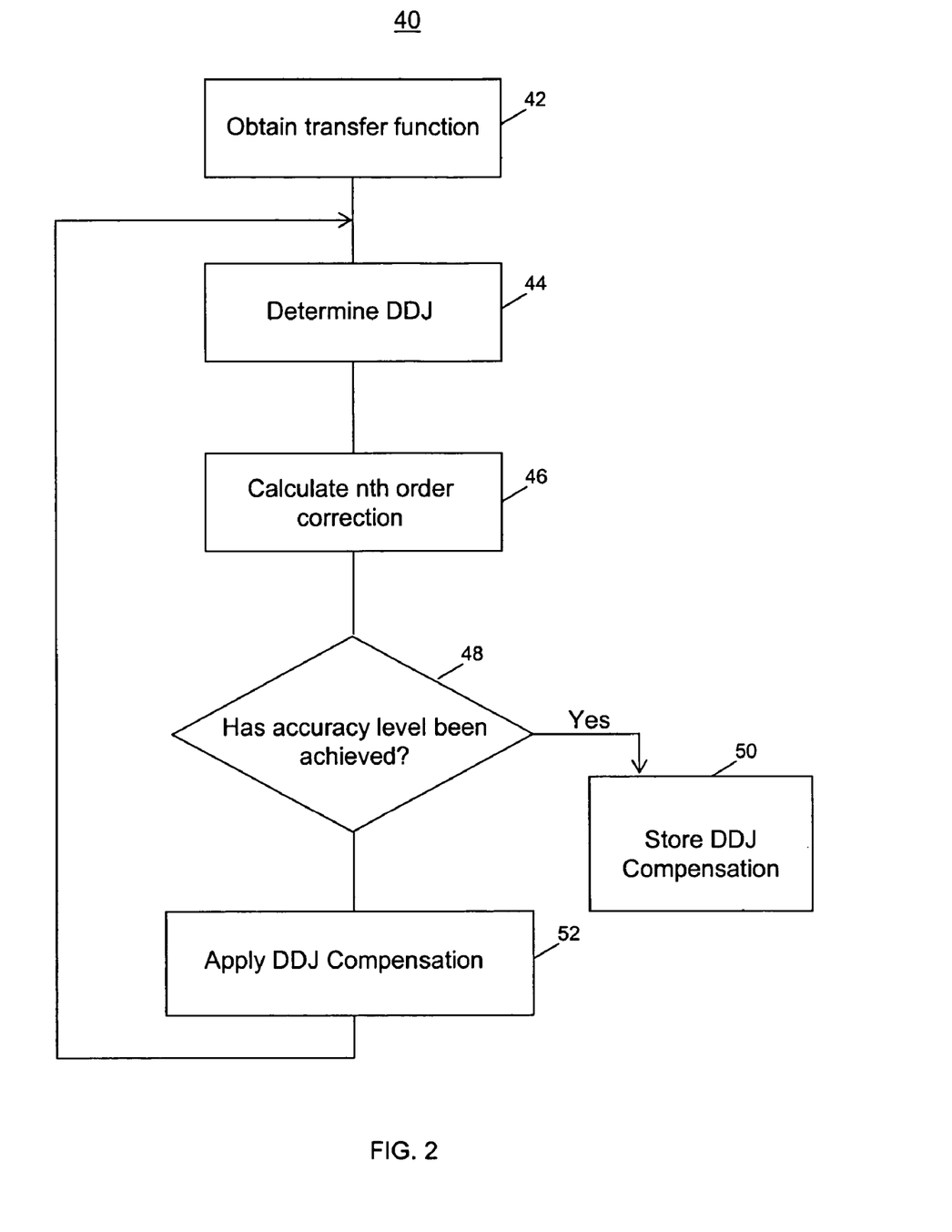

FIG. 2 shows a process 40 for adjusting edge positions of initial output signal 18 to compensate for DDJ induced from transmission medium 16. The process 40 includes obtaining (42) a transfer function (denoted by H(t)) for describing the transfer characteristics of the transmission medium 16. The transfer function is obtained (42) using transfer function measuring instrument 27. The transfer characteristics are the intrinsic parameters of transmission medium 16 subsystem that when applied to an input of transmission medium 16, will fully describe its output. Thus if H(t) for transmission medium 16 is known, then the propagated output signal 20 can be calculated for any given initial output signal 18 (i.e., the input to transmission medium 16). Propagated output signal 20, y(t), is expressed as the convolution of the transfer function, H(t), and initial output signal 18, y(t):

$$y(t)=H(t)\otimes x(t),$$

where $\otimes$ is a convolution operator. The transfer function H(t) is also referred to as the unit impulse response because the transfer function describes the output that is produced when a unit impulse function is applied to the input of transmission medium 16. The unit impulse function has infinite amplitude, zero width, and an area of unity. In theory, the transfer function could be found directly by applying a unit impulse function to the transmission medium 16 and measuring the response at the output. However, the unit impulse function is not a real signal and is difficult to approximate. Instead, the transfer function is determined indirectly by finding the step response of transmission medium 16 and then taking the derivative of the step response to obtain the transfer function. The step response of the transmission medium is obtained by applying a unit step function to the input of the transmission medium 16 and measuring the output. The output is the convolution of the unit step function and the step response. The unit step function is a discontinuous function whose value is zero for negative argument and unity for positive argument. The unit step function is simply a running integral of the unit impulse response function. Like a unit impulse function, a unit step function cannot be produced in reality. However a unit step function can be approximated much more accurately by a real function than can a unit impulse function. A long rectangular wave with a fast rising edge is used to approximate a unit step function.

After the transfer function of transmission medium 16 is obtained (42), the transfer function is used to simulate a propagated output signal 20 (i.e., y(t)) for a given initial output signal 18 (i.e., x(t)). The propagated output signal 20 is determined by convolving the initial output signal 18 with the transfer function. From the simulated propagated output signal 20, the DDJ for the bit sequence is calculated (44). For each bit in the sequence, the determined edge timing error of the bit is subtracted from the edge position of the bit. For example, if the timing error for a first bit in a sequence is known to be a 100 ps delay, the testing instrument 12 will advance the first bit's edge position by 100 ps to compensate for the 100 ps delay. The relationship between timing error and the amount by which the edge position is advanced (or delayed) is not a direct linear relationship; therefore, advancing an edge position by 100 ps will not perfectly cancel out a 100 ps delay resulting from DDJ. Rather, the compensation may for example, cancel out the 100 ps delay by 90%, but the edge positions of the propagated output would still be delayed 10 ps from their expected positions. Thus, the compensation is accurate to first order. If a higher accuracy level is needed (48), the compensated edge positions are applied (52) to the transfer function, and the simulating (44) and correcting (46) procedures are performed until a desired level of accuracy is reached (e.g., second order accuracy, third order accuracy, etc.). After a desired level of accuracy has been achieved (48), the compensated edge positions of the bit sequence are stored (50) in lookup table 24 of transfer function measuring instrument 27. The lookup table 24 is then stored in testing instrument 12 The level of accuracy that is achieved is ultimately limited by resolution of testing instrument 12. Process 40 is repeated for other combinations of bit sequences. In some embodiments, the compensated edge positions for a bit sequence are determined by directly measuring DDJ of the output using DDJ measuring instrument 22.

In these embodiments, the compensated edge positions are stored in lookup table 24 in DDJ measuring instrument 22. Lookup table 24 is then stored in testing instrument 12.

Figure 3:
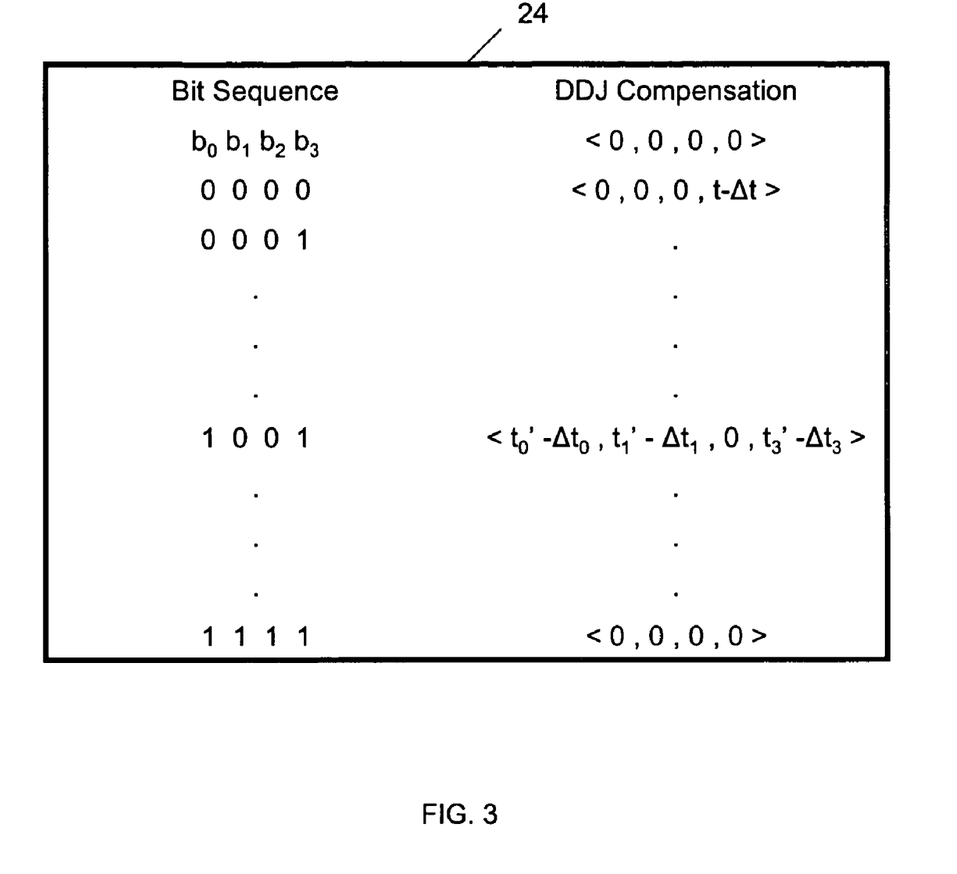
FIG. 3 shows an exemplary lookup table produced by the process described in FIG. 2.

FIG. 3 shows an exemplary lookup table 24 produced by process 40. Lookup table 24 includes compensated edge positions for sixteen binary sequences of four bits (e.g., $b_0$, $b_1$, $b_2$, and $b_3$). The compensated edge positions quantify the amount of advance or delay that is to be added to each bit in the sequence so that the receiving device 14 sees the transition when it expects (e.g., at times $t_0$, $t_1$, $t_2$, and $t_3$). For example, the compensated edge positions of a "1001" binary sequence is ($t_0'-\Delta t_0$, $t_1'-\Delta t_1$, 0, and $t_3'-\Delta t_3$). For example, the first bit of the sequence, $b_0$, is expected to be delayed by $\Delta t_0$; therefore, the edge is advanced by $\Delta t_0$ to compensate for the delay. In this example, the compensated edge positions are ($t_0'-\Delta t_0$, $t_1'-\Delta t_1$, 0, and $t_3'-\Delta t_3$) to correct edge timing errors to first order. In other embodiments, some of the compensated edge positions may provide higher orders of correction (e.g., second and third order corrections).

In some embodiments, lookup table 24 stores compensated edge positions for $2^B$ combinations of binary sequences that each contains B bits. For example, lookup table 24 could store 32 combinations of a 5-bit sequence or 64 combinations of a 6-bit sequence. In some embodiments, lookup table 24 stores one set of compensated edge positions for each bit sequence. In other embodiments, if there are redundant sets of compensated edge positions, lookup table 24 stores only one of the redundant sets.

Storing only one of the redundant sets frees up memory space in lookup table 24.

Figure 4A:
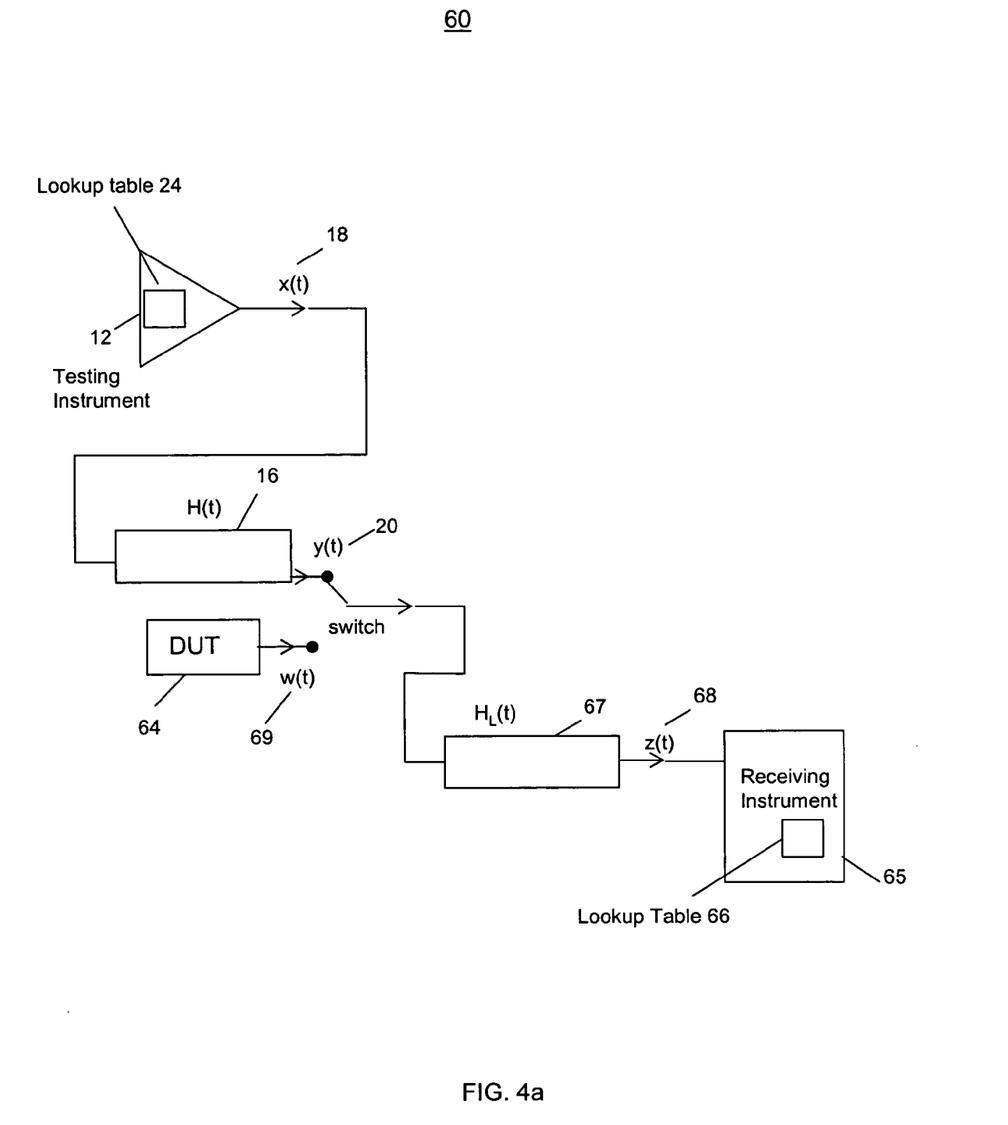
FIG. 4a shows a block diagram of another testing system for characterizing jitter in a communication system.
Figure 4B:
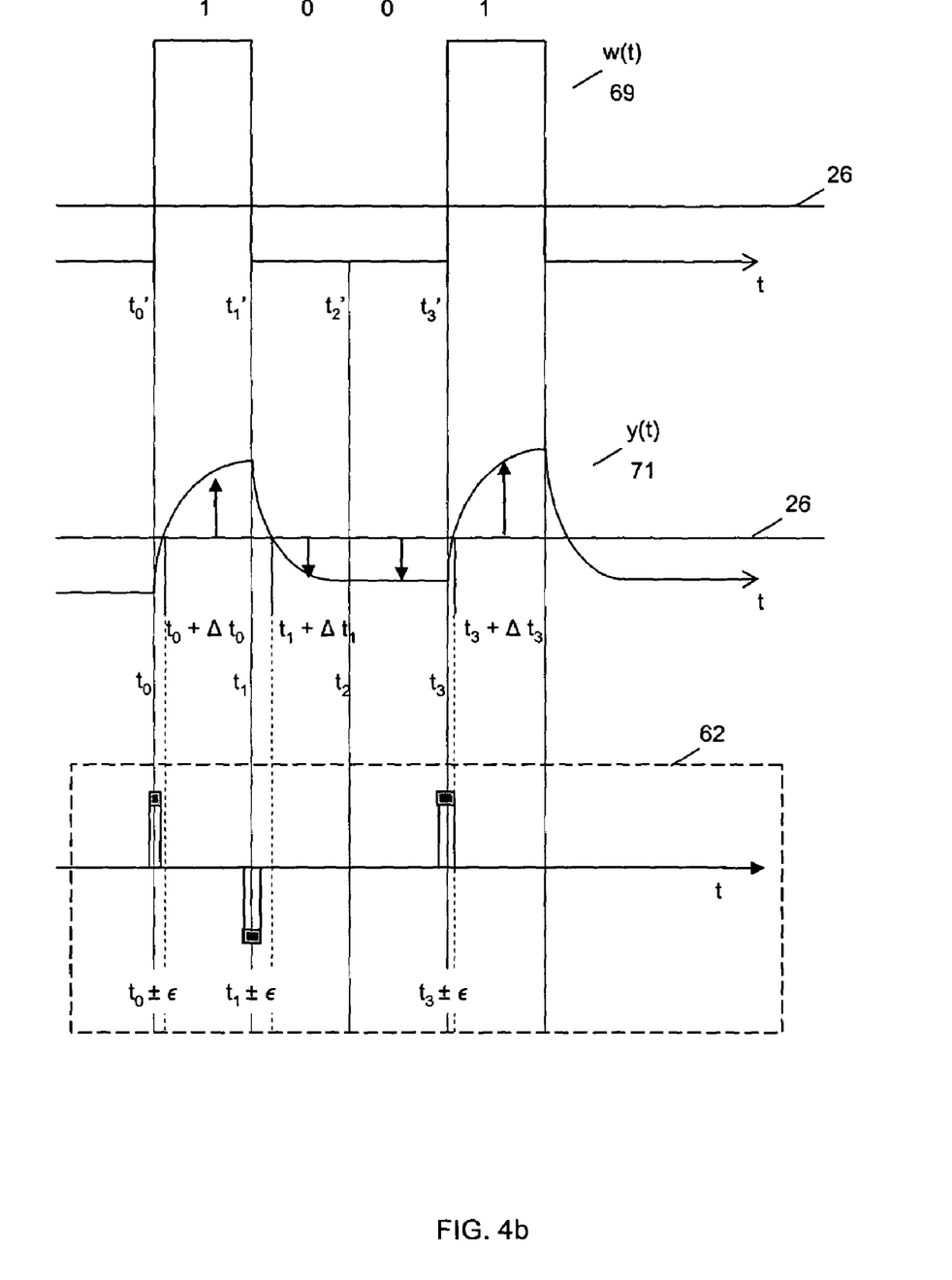

FIGS. 4a-b shows a test system 60 for characterizing and compensating for jitter at a receiving instrument 65. Test system 60 includes a testing instrument 12, a receiving instrument 65, a device under test (DUT) 64 that sends signals to receiving instrument 65, a transmission medium 16 that interfaces testing device 12, and a transmission medium 67 that interfaces receiving instrument 65 and either transmission medium 67 or DUT 64. Examples of transmission mediums 16 and 67 include conductors (e.g., cables and wires), fiber optics, and wireless channels. In some embodiments, the data transmission speeds of transmission mediums 16 range between 100 MHz and 10 GHz. DUT 64 may be any data communication device. Examples of DUT 64 include modems, Ethernet cards, and audio codecs. The signal that is initially produced by testing instrument 12 and seen at the input of transmission medium 16, is referred to as initial output signal 18, i.e., denoted x(t). After the signal has propagated through transmission medium 16, the signal is referred to as propagated output signal 20, i.e., denoted y(t). The edge positions of initial output signal 18 are adjusted using system 10 (FIG. 1*a*) and process 40 (FIG. 2) to compensate for DDJ induced by transmission medium 16. Propagated output signal 20 has little to no DDJ before it reaches transmission medium 67. The signal sent by testing instrument 12 that has propagated through transmission medium 67 is referred to as received signal 68, i.e., denoted z(t). Receiving instrument 65 measures received signal 68 and determines its amplitude as a function of time. Receiving instrument 65 also determines the DDJ in received signal 68. The DDJ that is measured is contributed from both transmission medium 67 and receiving instrument 65. Receiving instrument 65 may be any data acquisition instrument, such as an oscilloscope or a logic analyzer. The connection to the input of transmission medium 67 is switched to connect to the output of DUT 64. DUT 64 produces an initial output signal 69, i.e., denoted w(t). The signal from DUT 64 propagates through transmission medium 67 and is received at receiving instrument 65. The signal sent by DUT 64 that has propagated through transmission medium 67 is referred to as propagated output signal 71, i.e., denoted v(t) (FIG. 4*b*). Receiving instrument 65 measures the DDJ in signal 71 it received from DUT 64. Receiving instrument 65 then subtracts the DDJ contributed by transmission medium 67 and itself. The DDJ that results from the subtraction is the DDJ contributed by DUT 64. In this manner, testing system 60 determines the DDJ contributed by DUT 64 alone.

In system 60, DDJ compensation is performed at the receiving instrument 14, rather than the DUT 64 that is transmitting the signal. As shown in FIG. 4*b*, at the receiving instrument 65, information is extracted from the propagated output signal 71 of DUT 64 by sampling the signal 71 at specific instants of time, referred to as sampling instances (shown as up and down arrows). Timing diagram 62 shows the transition windows of time over which edge transitions are expected occur. Under ideal conditions without DDJ, the windows are $t_0 \pm \epsilon$, $t_1 \pm \epsilon$, and $t_3 \pm \epsilon$. The transition windows marked with a dark line on the top anticipate low to high transitions and the windows marked with a dark line on the bottom anticipate high to low transitions. Ideally, in a system without DDJ, the transition windows would be uniformly distributed. The presence of jitter changes the distribution of the transition windows.

System 60 compensates for DDJ at the receiving instrument 65 by moving the positions of the transition windows according to the amount of DDJ calculated for a received propagated output signal 71. For example, the transition window centered at $t_0$ would instead be centered at $t_0+\Delta t_0$ to compensate for jitter present in the first bit, $b_0$. The transfer function, H(t), of the DUT 64 and transmission medium 67 is measured at receiving instrument 65. The transition window positions for different combinations of bit sequences are calculated using the transfer function and then stored in lookup table 66 of instrument 65 and stored in memory. When receiving instrument 65 captures a signal sent from the DUT 64, receiving instrument 65 compares the transition times of the signal to the many different distributions of transition window positions stored in lookup table 66. After determining a match, receiving instrument 65 looks up the bit sequence assigned to the matching transition-window-position distribution. In this way, receiving instrument 65 extracts the correct values from the propagated output signal 71 in which DDJ is present.

Figure 5:
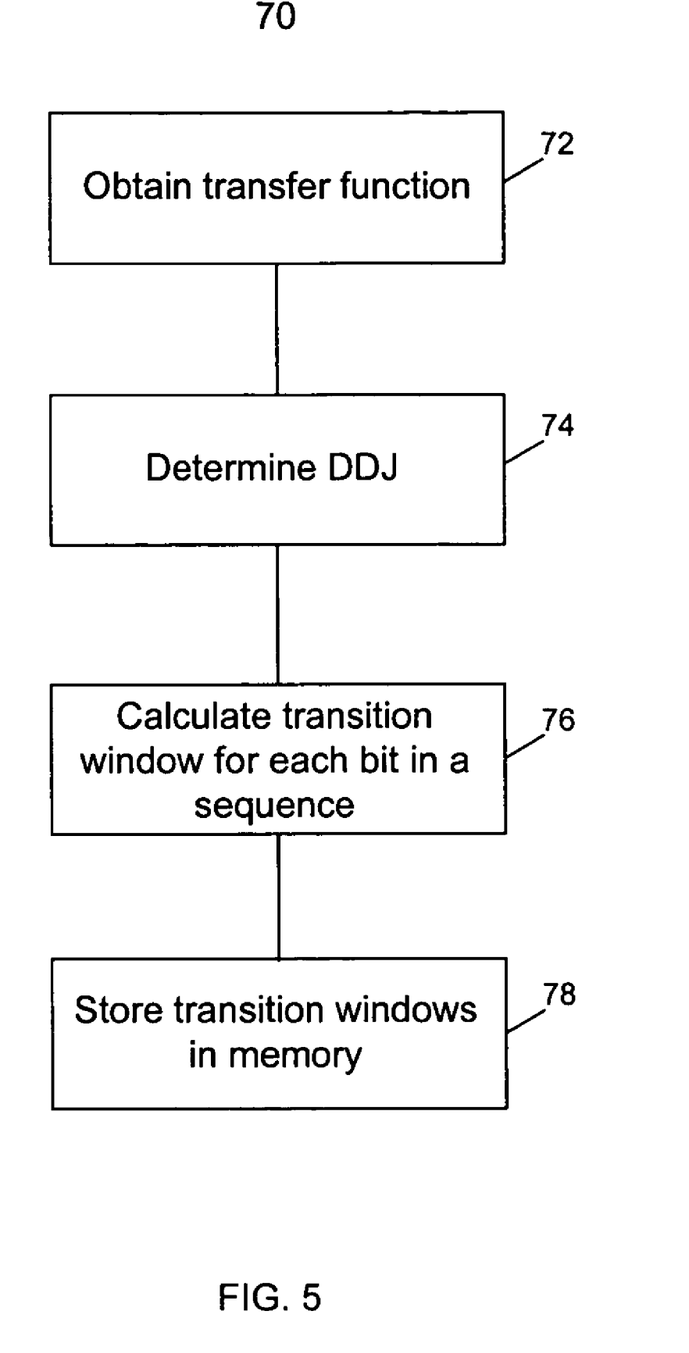

FIG. 5 shows a process 70 for compensating for DDJ at receiving instrument 65.

The transfer function of the DUT 64 and transmission medium 67 is obtained (72) by measuring the step response of DUT 64 and transmission medium 67 and taking the derivative of the step response function. After the transfer function of transmission medium 67 and DUT 64 is obtained (72), the transfer function is used to simulate a propagated output signal 71 (i.e., v(t)) for a given initial output signal 69 (i.e., w(t)) from DUT 64. The propagated output signal 71 is determined by convolving the initial output signal 69 of DUT 64 with the transfer function. From the simulated received signal 68, the DDJ for the bit sequence is determined (74). For each bit in the sequence, transition window is calculated (76). For example, if the edge position of a first bit is determined to occur at $t_0+\Delta t_0$, the transition window assigned to the first bit is centered at $t_0+\Delta t_0$. If the transition window has a width, $\epsilon$, the transition window is $t_0+\Delta t_0 \pm \epsilon$. The calculated transition windows of the bit sequence are stored (78) in lookup table 66 of receiving 30 instrument 65. Process 60 is repeated for other combinations of bit sequences. In some embodiments, the DDJ for the bit sequence is measured directly using DDJ measuring instrument 22. In these embodiments, the transition windows are stored in lookup table 66 residing in DDJ measuring instrument 22. Lookup table 66 is then sent to receiving instrument 65 and stored in its memory.

When receiving instrument 65 captures a signal sent from the DUT 64, receiving instrument 65 compares the transition times of the signal to the many different distributions of transition window positions stored in lookup table 66. After determining a match, receiving instrument 65 looks up the bit sequence assigned to the matching transition-window-position distribution. In this way, receiving instrument 65 extracts the correct values from the propagated output signal 71 in which DDJ is present.

Figure 6:
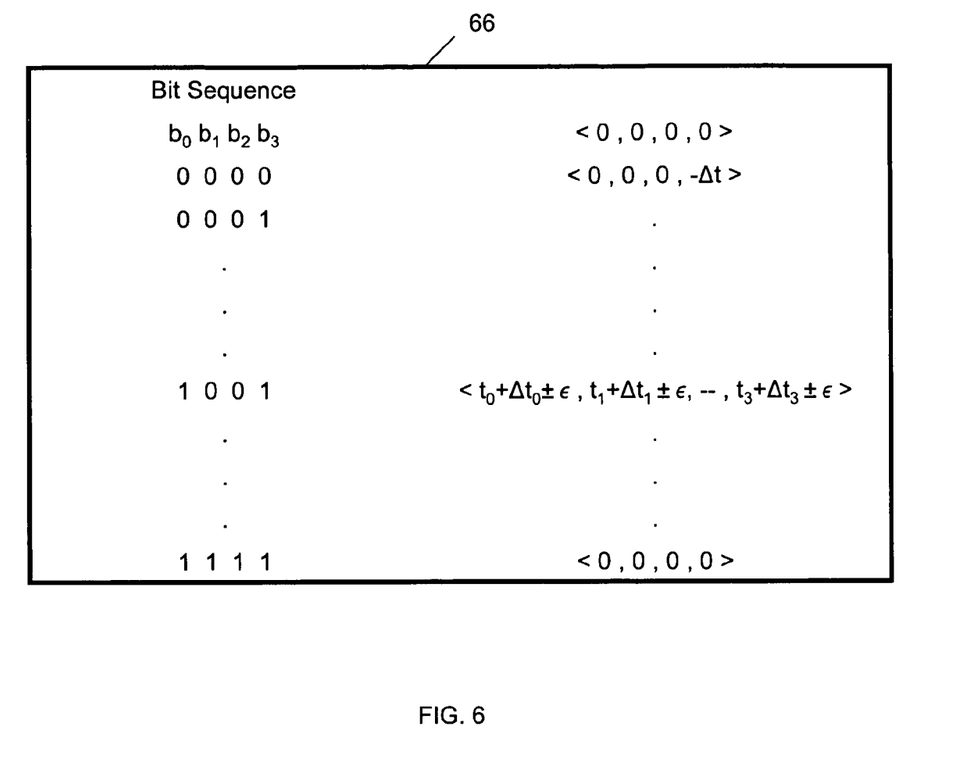
FIG. 6 shows an exemplary lookup table produced by the process described in FIG. 5.

FIG. 6 shows an exemplary lookup table 66 produced by process 40. Lookup table 66 transition windows calculated for sixteen binary sequences of four bits (e.g., $b_0$, $b_1$, $b_2$, and $b_3$). The transition windows take into account the amount of DDJ that is present in each bit. For example, the centers of the transition windows for the first, second, and third bits ($b_0$, $b_1$, and $b_3$, respectively) of bit sequence "1001" are centered at $t_0+\Delta t_0$, $t_1+\Delta t_1$, and $t_3+\Delta t_3$, respectively, to compensate for DDJ. For this bit sequence, there is no transition window between $b_1$ and $b_2$ because $b_1$ and $b_2$ are both the same value. In some embodiments, lookup table 66 stores compensated edge positions for $2^B$ combinations of binary sequences that each contains B bits. For example, lookup table 66 could store 32 combinations of a 5-bit sequence or 64 combinations of a 6-bit sequence. In some embodiments, lookup table 66 stores a distribution of transition windows for each bit sequence. In other embodiments, if there are redundant distributions of transition windows, lookup table 66 stores only one of the redundant distributions. Storing only one of the redundant distributions frees up memory space in lookup table 66.

Processes 40 and 70 are not limited to use with the hardware and software described herein. Processes 40 and 70 can be implemented in digital electronic circuitry, or in computer hardware, firmware, software, or in combinations thereof.

Processes 40 and 70 can be implemented, at least in part, via a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with implementing processes 40 and 70 can be performed by one or more programmable processors executing one or more computer programs to perform the functions of the processes. All or part of processes 40 and 70 can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

The circuitry described herein, including the testing instrument 12, transmission medium 16, receiving instrument 65, and DUT 64 and/or portions thereof, may be implemented as part of testing systems 10 and 60 or as separate circuitry for use in conjunction with testing systems 10 and 60.

A number of embodiments of the invention have been described. Nevertheless, it will be understood that various modifications may be made without departing from the spirit and scope of the invention. For example, in some embodiments in which the transmission mediums of systems 10 and 60 include long cables or other equipment that cannot easily be tested in a laboratory, the transfer functions of the long cables are measured or estimated separately. The transfer function of the long cable is used to simulate the DDJ that would result for multiple known bit sequences. In the laboratory, the systems 10 and 60 are built; however, transmission medium 16 only contains those components that can fit in the laboratory, the other components (e.g., long cables) are not included. In some embodiments, the transmission medium is a long cable that cannot easily be tested in a laboratory. Therefore a small portion of the long cable is included in testing system 12. In these embodiments, transmission medium 16 includes only the small portion of the cable. The DDJ contributed by the remaining portion of the cable is calculated or estimated separately. The simulated DDJ resulting from propagation through the remaining portion of the cable is then added to the initial output signal 18 before signal is propagated through transmission medium 16 (i.e., the smaller portion of the cable). Therefore, the DDJ that is present in propagated output signal 20 is the DDJ contributed by the whole cable, even though only a small portion of the cable is used in the physical testing setup. For example, if $H_L(t)$ denotes the transfer function of the remaining (i.e., longer) portion of the cable and H(t) denotes the transfer function of transmission medium 16, which is the small portion of the cable, the output signal that results from propagating an input, x(t), through transmission medium 16 will be given as:

$$y(t)=[H(t)+H_L(t)]\otimes x(t),$$

where $\otimes$ is a convolution operator. In this way, the DDJ contributed from components of transmission medium that cannot easily be physically included in testing systems 10 and 60, is measured and compensated. The DDJ contributed from the other components present in the transmission medium are determined using the processes 40 and 70 described in FIGS. 2 and 5, respectively. Accordingly, other embodiments are within the scope of the following claims.

What is claimed is:

1. A method for compensating for jitter in a communication system, the method comprising:
    measuring a transfer function of a transmission medium;
    calculating an output signal that results from propagating an input signal through the transmission medium by convolving the transfer function with the input signal;
    determining data dependent jitter in the output signal;
    compensating edge positions of the input signal based on the determined data dependent jitter; and
    in memory, storing compensated edge positions of the input signal, the compensated edge positions being arranged such that the data dependent jitter causes edge positions of the output signal to move closer to ideal edge positions.

2. The method of claim 1, wherein measuring the transfer function comprises:
    calculating an output signal of the transmission medium that results from propagating an approximated step function through the transmission medium;
    calculating a step response of the transmission medium from the approximated step function and the calculated output signal; and
    differentiating the step response to obtain the transfer function.

3. The method of claim 1, further comprising:
    convolving a signal having the compensated edge positions with the transfer function to calculate compensated edge positions that correct the data dependent jitter to second order.

4. The method of claim 1, further comprising calculating a first distribution of transition windows for the output signal, the transition windows being time intervals over which edge transitions are expected occur when data dependent jitter is present in the output signal.

5. The method of claim 4, further comprising:
    calculating a second distribution of transition windows for a second output signal that results from propagating a second input signal through the transmission medium; and, at the receiving device, storing the distributions of transition windows in memory.

6. The method of claim 1 wherein calculating the output signal further comprises injecting data dependent jitter calculated for a second transmission medium such that the receiving device receives data dependent jitter contributed from the first transmission medium and the second transmission medium.

7. The method of claim 5, further comprising:
    capturing a signal at the receiving device; and
    comparing transition times of the signal to the distributions of transition windows stored in memory; and
    looking up a bit sequence that corresponds to the distribution that most closely matches the transitions times of the signal.

8. A system for compensating for jitter in a communication system, the system comprising:
    a measuring instrument configured to:
        measure a transfer function of a transmission medium;
        calculate an output signal that results from propagating an input signal through the transmission medium by convolving the transfer function with the input signal;
        determine data dependent jitter in the output signal; and compensate edge positions of the input signal based on the determined data dependent jitter;

memory for storing compensated edge positions of the input signal, the compensated edge positions being arranged such that the data dependent jitter causes edge positions of the output signal to move closer to ideal edge positions; and a testing instrument for propagating an approximated step function through the transmission medium, wherein the measuring instrument is further configured to:
calculate an output signal of the transmission medium that results from propagating an approximated step function through the transmission medium;
calculate the step response of the transmission medium from the approximated step function and the calculated output signal; and
differentiate the step response to obtain the transfer function.

9. The system of claim 8, wherein the testing instrument further comprises memory for storing the table of compensated edge positions of the initial output signal.

10. The system of claim 9, wherein the memory stores compensated edge positions that correct the data dependent jitter to second order.

11. The system of claim 8, wherein the measuring instrument is further configured to:
calculate a first distribution of transition windows for the output signal, the edge transition windows being time intervals over which edge transitions are expected occur when data dependent jitter is present in output signal; and
calculate a second distribution of transition windows for a second output signal that results from propagating a second input signal through the transmission medium.

12. The system of claim 11, further comprising:
a receiving device comprising memory for storing the distributions of transition windows calculated by the measuring instrument, wherein the receiving device is configured to:
capture a signal;
compare transition times of the signal to the distributions of transition window stored in the memory; and
look up a bit sequence that corresponds to the distribution that most closely matches the transitions times of the signal.

13. The system of claim 12, wherein the memory stores only one distribution of transition windows from a set of redundant distributions of transition windows.

14. A computer program product tangibly embodied in an information carrier, the computer program product comprising instructions that, when executed by one or more programmable processors, cause one or more computers to:
measure a transfer function of a transmission medium;
calculate an output signal that results from propagating an input signal through the transmission medium by convolving the transfer function with the input signal;
determine data dependent jitter in the output signal;
compensate edge positions of the input signal based on the determined data dependent jitter;
and store, in memory, compensated edge positions of the input signal, the compensated edge positions being arranged such that the data dependent jitter causes edge positions of the output signal to move closer to ideal edge positions.

15. The computer program product of claim 14 comprising further instructions that cause the one or more computers to:
calculate an output signal of the transmission medium that results from propagating an approximated step function through the transmission medium;
calculate a step response of the transmission medium from the approximated step function and the calculated output signal; and
differentiate the step response to obtain the transfer function.

16. The computer program product of claim 15 comprising further instructions that cause the one or more computers to:
convolve a signal having the compensated edge positions with the transfer function to calculate compensated edge positions that correct the data dependent jitter to second order.

17. The computer program product of claim 14 comprising further instructions that cause the one or more computers to calculate a distribution of transition windows for the output signal, the transition windows being time intervals over which edge transitions are expected occur when data dependent jitter is present in the output signal.

18. The computer program product of claim 15 comprising further instructions that cause the one or more computers to calculate a second distribution of transition windows for a second output signal that results from propagating a second input signal through the transmission medium.

19. The computer program product of claim 18 comprising further instructions that cause the one or more computers to store the distributions of transition windows in memory.

20. The computer program product of claim 19 comprising further instructions that cause the one or more computers to:
capture a signal at the receiving device;
compare transition times of the signal to the distributions of transition window stored in memory; and
and look up, in the memory, a bit sequence that corresponds to the distribution that most closely matches the transitions times of the signal.

* * * * *